United States Patent [19]

Sasaki et al.

[11] Patent Number: 5,394,550
[45] Date of Patent: Feb. 28, 1995

[54] SYSTEM FOR AFFECTING RECOMPILATION OF SOURCE CODE

[75] Inventors: Daisuke Sasaki; Shuji Koseki, both of Hadano, Japan

[73] Assignees: Hitachi Ltd.; Hitachi Electronics Services Co. Ltd., both of Tokyo, Japan

[21] Appl. No.: 4,533

[22] Filed: Jan. 14, 1993

[30] Foreign Application Priority Data

Jan. 20, 1992 [JP] Japan .................................. 4-007672

[51] Int. Cl.⁶ ................................................ G06F 9/45
[52] U.S. Cl. .............................. 395/700; 364/DIG. 1; 364/280.4; 364/285.2; 364/285.3
[58] Field of Search ...................... 395/700; 364/280.4, 364/285.2, 285.3

[56] References Cited

U.S. PATENT DOCUMENTS 5,204,960  4/1993  Smith et al. ......................... 395/700

FOREIGN PATENT DOCUMENTS 1-267732 10/1989 Japan .
2-036434  2/1990 Japan .
2-249034 10/1990 Japan .

*Primary Examiner*—Kevin A. Kriess
*Assistant Examiner*—A. Katbab
*Attorney, Agent, or Firm*—Fay, Sharpe, Beall, Fagan, Minnich & McKee

[57] ABSTRACT

In compiling a source program by a compiler and sequentially generating an intermediate code, the intermediate code is managed by referencing it to the corresponding statement of the source program. When an error is detected during the compiling operation, the operation is stopped. After the error is corrected, the compiling operation resumes. In this case, the compiling operation starts not from the start of the source program, but from the error detected location of the source program. Compiled intermediate codes are added to the previously compiled correct intermediate codes.

7 Claims, 3 Drawing Sheets

FIG. 3
SOURCE PROGRAM
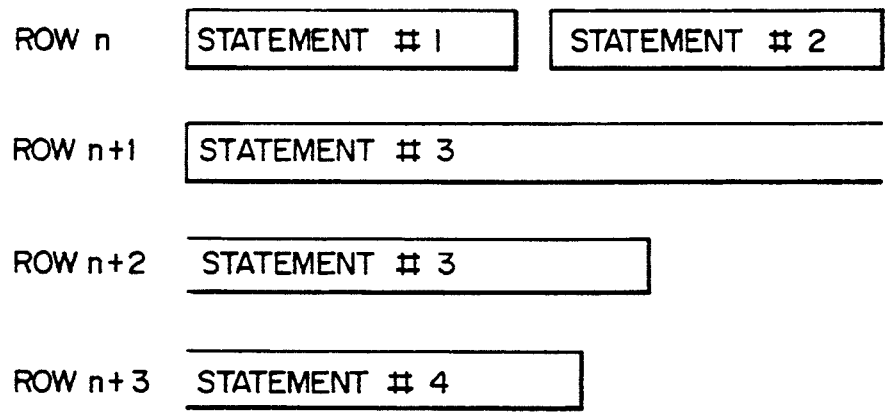
FIG. 4
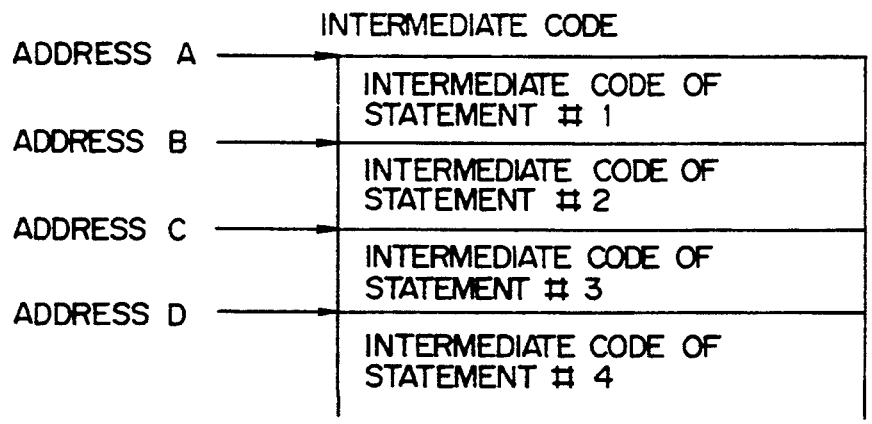
FIG. 5
INTERMEDIATE CODE MANAGING TABLE
| ROW NO. | ADDRESS |
|---|---|
| . | . |
| . | . |
| n | |
| n + 1 | |
| n + 2 | |
| n + 3 | |
| . | . |
| . | . |

SYSTEM FOR AFFECTING RECOMPILATION OF SOURCE CODE

BACKGROUND OF THE INVENTION

Field of the Invention

The present invention relates to program compiling systems, and more particularly to a compiling system capable of efficiently compiling a source program even if an error is detected while compiling.

Description of the Related Art

A term "compile" means to convert a source program written by high level language such as COBOL and C into an object program written by machine language executable by computers. The wide variety of compilers have been developed heretofore. A compiler sequentially translates a source program to generate compiled information such as intermediate codes. After the source program is completely translated, the object program is generated by collecting the compiled information.

With a conventional compiling system such as C language compilers, if an error is detected while compiling a source program, the compiling operation is terminated by informing the contents of the error. The compiled information prior to the detection of the error is discarded irrespective of whether the information is valid or not.

With another conventional compiling system, even if an error is detected, the compiling operation is maintained to continue although the compiled information after the detection of the error is invalid. In this case, invalid information is generated and error information is outputted. Namely, if a detected error is judged that the compiling operation can be allowed to continue, the contents of the error is informed and thereafter compiled information continues to be generated. Even in this case, it is necessary to again compile the source program after correcting the error. Therefore, all the compiled information generated first is discarded.

SUMMARY OF THE INVENTION

None of the above-described conventional compiling systems take into account the reuse of compiled information such as intermediate codes generated during the period from the operation start to the detection of a first error. Therefore, if an error is detected in a source program, it is necessary to correct the source program and thereafter to again execute the compiling operation from the start of the source program. Accordingly, the more the error detected location is near the end of the source program and the larger the capacity of the source program is, the more the complied information is required to be discarded even if the information is valid.

The above-described latter conventional system does not take into account the invalid compiling operation after an error is detected in a source program, posing a problem of generating unnecessarily compiled information.

The present invention has been made in consideration of the above-described problems. It is an object of the present invention to improve the efficiency of the program re-compiling operation after an error is detected.

It is another object of the present invention to provide a compiling system capable of efficiently reusing compiled information.

In order to achieve the above objects, the system configuration of the present invention is characterized by the following points.

A compiler compiles a source program to sequentially generate compiled information such as intermediate codes. The compiled information is stored in correspondence with the locations on the source program of the corresponding statement. The locations on the source program can be represented by a row number of the source program and the store location of the corresponding intermediate code.

When an error is detected, the compiled information is stored and the compiling operation is stopped. Thereafter, an operator corrects the source program in accordance with error information to bug the error.

After the error is corrected, the compiling operation resumes. In this case, the compiling operation starts not from the start of the source program, but from the error detected location of the source program, by using the stored compiled information. Compiled intermediate information is added to the previously compiled and stored information.

According to the present invention, compiled information such as intermediate codes previously compiled correctly can be effectively used for the recompiling operation, minimizing the amount of wastefully compiled information.

BRIEF DESCRIPTION OF THE DRAWINGS

FIG. 3 is a diagram showing an example of the locations of statements of a source program.

FIG. 4 is a diagram showing an example of the locations of intermediate codes generated from a source program.

FIG. 5 is an intermediate code management table.

DESCRIPTION OF THE PREFERRED EMBODIMENTS

An embodiment of the compiling system according to the present invention will be described with reference to the accompanying drawings.

Figure 1:
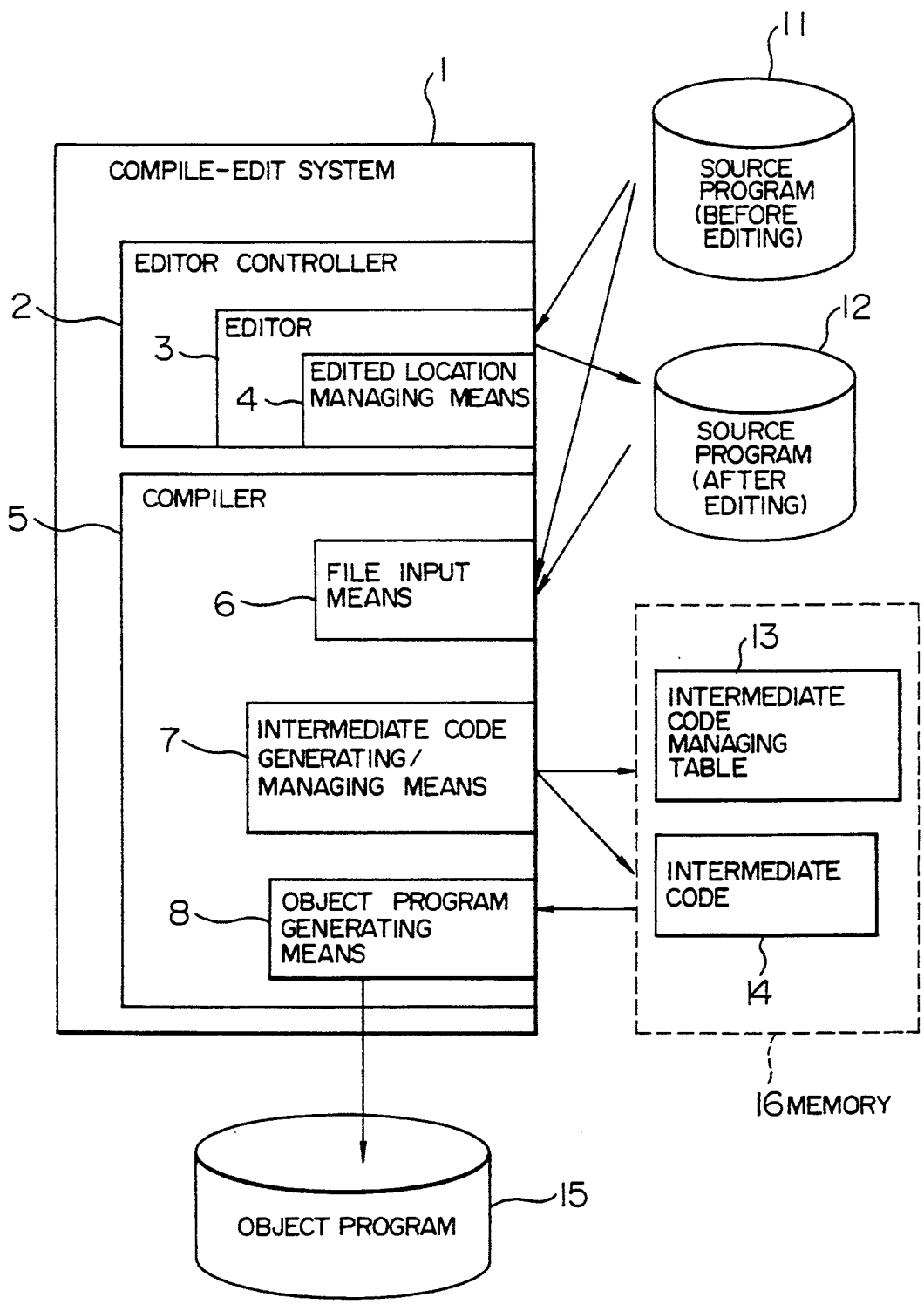
FIG. 1 is a block diagram showing the configuration of a compiling system according to an embodiment of the present invention.

Referring to FIG. 1, a compile-edit system 1 has both a compiler 5 and an editor controller 2 to improve the efficiency of correcting compiling errors. This system is generally realized on a computer.

An editor controller 2 including an editor 3 controls the editing operation such as editing a source program. The editor 3 reads a source program 11 still not edited, to allow an operator to edit and correct it. The edited and corrected source program 12 is stored in an arbitrary storage unit such as a magnetic disk, different from the storage unit storing the source program 11. The editor 3 has an edited location managing means 4 which manages the edited locations of the source program 11.

The compiler 5 translates the source program 11 or 12 to generate compiled information such as intermediate codes from which an object program 15 is generated. The compiler 5 has a file input means 6, intermediate code generating/managing means 7, and object program generating means 8. The file input means 6 reads a desired portion of the source program 11, 12. The intermediate code generating/managing means 7 compiles the source program 11, 12 into intermediate codes 14, and generates an intermediate code managing table 13. The intermediate code managing table 13 stores, for example, the location (row number) of each statement of the source program 11, 12 and the location of the intermediate code for the statement. The location of the intermediate code may be a corresponding stored address of the source program 11 in a storage unit. Both the intermediate code managing table 13 and intermediate code 14 are stored in the memory 16. The object program generating means 8 converts the generated intermediate codes 14 into object codes, and generates an object program 15.

Figure 2:
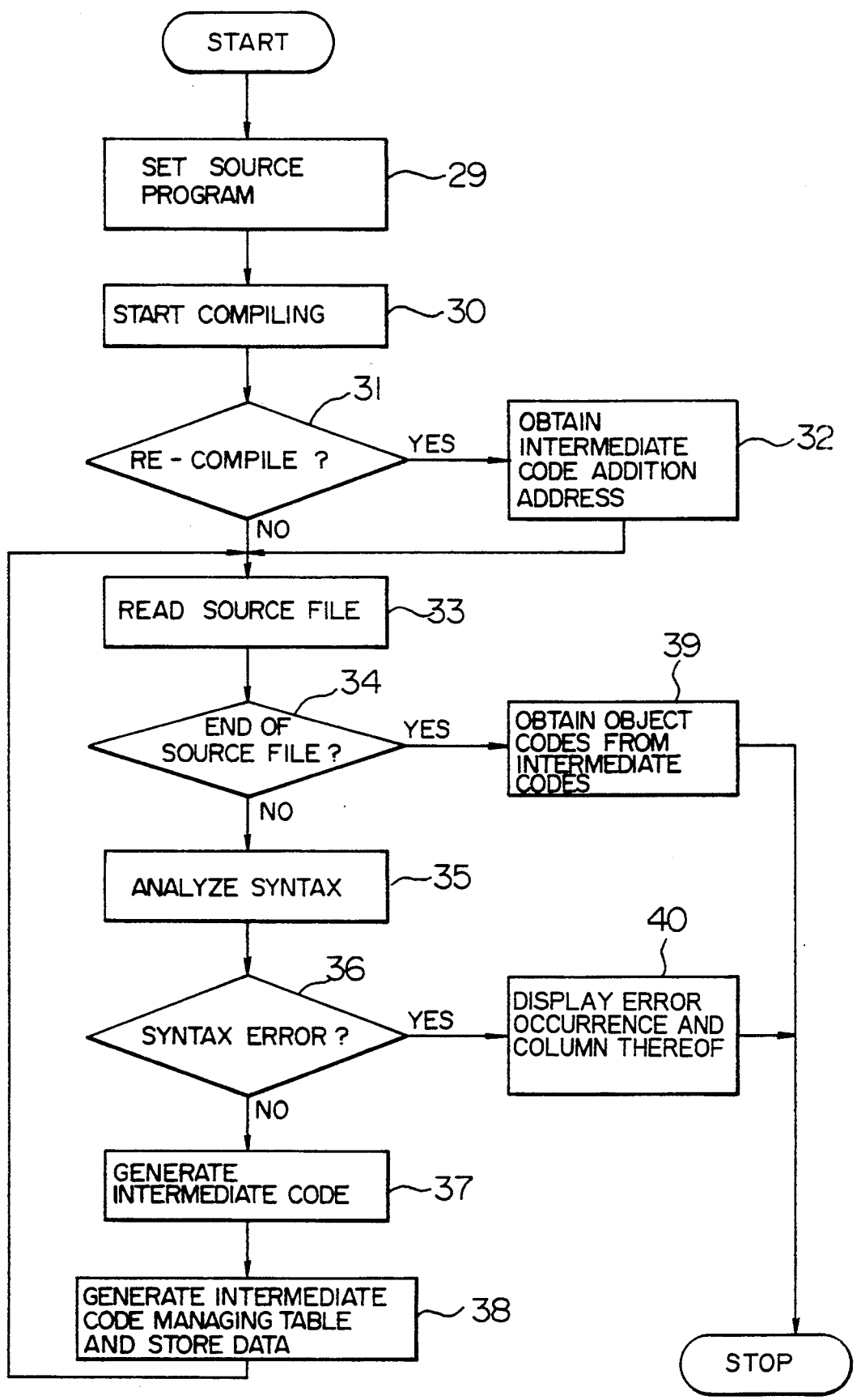
FIG. 2 is a flow chart illustrating the operation of the compiling system.

The compiling operation according to an embodiment of the present invention will be described with reference to the flow chart shown in FIG. 2. In the description of the embodiment procedure to follow, it is assumed that after an operator corrects an error detected while compiling a source program, the compiling operation is again executed.

(1) A source program 11 to be compiled is selected and set (step 29). The compiler 5 is started (step 30). It is checked whether the present compiling operation is the re-compiling operation (step 31). Whether the present compiling operation is the re-compiling operation can be discriminated from a presence/absence of data in the intermediate code managing table 13 or from a presence/absence of intermediate codes 14. If the present compiling operation is not the re-compiling operation, the file input means 6 sequentially reads one statement after another of the source program 11. The compiler 5 analyzes the syntax of the read source program 11 to check if the source program 11 matches the grammar of its language. If there is no error of the syntax, the compiler 5 generates intermediate codes 14 (steps 33 to 37). The row number of each intermediate code of the source program and the address of the memory 16 at which the intermediate code was stored, are registered in the intermediate code managing table 13 to return to step 33 (step 38). The similar operations are repeated from step 33. If there is a syntax error at step 36, the row number of the incorrect statement is displayed and the operation of the compiler 5 is stopped (step 40).

(2) In response to the displayed error row number, the operator edits and corrects the source program 11 by using the editor 3. The edited source program 12 is stored in a different area of the storage unit. The edited location managing means 4 stores the edited and corrected row number, and adds edited location information representative of the row number of the corrected statement nearest the start of the source program 12, to the source program 12.

(3) Then, the re-compiling operation of the edited source program starts. Basically, the operations as described in (1) are executed. The source program 12 to be re-compiled is selected and set (step 29). The compiler 5 is started (step 30). It is checked whether the present compiling operation is the re-compiling operation (step 31). Since the present compiling operation is the re-compiling operation, the editor controller 2 checks the edited location information added to the source program 12 representing the row number of the corrected statement, and the read start location of the source program 12 is set in the compiler 5. If data obtained at the previous compiling operation is present in the intermediate code managing table 13, it is referenced and the addition start location for intermediate codes 14 is set (step 32). Next, the source program 12 is sequentially read starting from the read start location (step 33). The operations at steps 34 to 40 are executed in the similar manner to the operations described in (1). When all statements are read and intermediate codes are generated without any error, the generated intermediate codes are converted into an object program 15 by the object program generating means 8. Thereafter the procedure is terminated (steps 34 and 39).

Generating intermediate codes will be described more specifically with reference to FIGS. 3 to 5. FIG. 3 is a diagram showing an example of the locations of source program statements.

For example, if one row of a source program contains one statement as in the case of the row (n+3) shown in FIG. 3 with one statement #4, the address D of the intermediate code 14 corresponding to the statement #4 in the memory 16 is assigned as the intermediate code location for the row number (n+3). The address D is stored in the intermediate code managing table 13 for the row number (n+3) as shown in FIG. 5.

If one row of a source program contains a plurality of statements as in the case of the row (n) shown in FIG. 3 with two statements #1 and #2, the address A of the intermediate code 14 corresponding to the head statement #1 in the row (n) is assigned as the intermediate code location for the row number (n), and stored in the intermediate code managing table 13.

If one statement is written at a plurality of rows as in the case of the statement #3 written at rows (n+1) and (n+2), the same address C is assigned to both the rows (n+1) and (n+2) as the intermediate code location because only one intermediate code is generated for the statement written at the rows (n+1) and (n+2), and the same addresses are stored in the intermediate code managing table 13.

When an error is detected during the syntax analysis, the intermediate codes for the statements immediately before the statement for which the error was detected is preserved Data in the intermediate code managing table is preserved, and thereafter the compiling operation is intercepted or terminated. For example, when an error is detected at row (n+1) shown in FIG. 3, the intermediate codes just before the address C and a starting address C of the detected statement at the row (n+1) are preserved. In this case, the compiler 5 may execute other operations in response to the error detection, for example, the operation of generating and outputting error information or the like necessary for correcting the source program 12. If desired, the editor controller 2 may automatically activate the editor 3 to correct the source program in accordance with the error information or the like.

As described above, according to the embodiment, the re-compiling operations can be limited to only necessary operations and can be reduced in amount as less as possible, improving the efficiencies of compiling and programming.

Various modifications are possible without departing from the scope of the present invention. For example, in the above embodiment, the source programs 11 and 12 before and after editing are stored in different storage units. Instead, they may be stored in the same storage unit. The storage unit is not limited to a magnetic disk, but obviously other storage units such as a main memory may also be used.

Furthermore, although the above embodiment uses intermediates codes and data in the intermediate code managing table, other information may be used depending upon program language of a source program to be compiled.

Still further, although the edited location information is added to the source program 12 by the edited location managing means 4, the edited location information may be held by the edited location managing means 4 itself.

What is claimed is:

1. A method of compiling a source program into an object program comprising the steps of:
    converting said source program on a predetermined unit basis into an intermediate code;
    correlating said converted intermediate codes with said source program to be compiled and managing information representing the correlation;
    intercepting a compiling operation when an error is detected;
    if the compiling operation is again executed after said error is corrected, determining the range of said source program correctly compiled, in accordance with said information;
    resuming the compiling operation of said source program immediately after said range of said source program correctly compiled; and
    converting said generated intermediate code to the object program.

2. A compiling method according to claim 1, wherein said predetermined unit is a statement unit of said source program.

3. A compiling method according to claim 2, wherein said converted intermediate code is temporarily stored in a storage unit.

4. A compiling method according to claim 3, wherein said step of generating management information generates a table which represents each converted statement of said source program and a store location of said intermediate code corresponding to said converted statement in said storage unit, with a correspondence between each said converted statement and said location.

5. A compiling method according to claim 4, wherein said step of determining the range determines said range of said source program correctly compiled, in accordance with information stored in said table immediately before said error detection.

6. A compiler for converting a source program written by statements into an object program, comprising:
    converting means for reading each statement of said source program and converting said statement into compiled information inclusive of intermediate codes;
    storage means for storing said compiled information;
    means for generating a table which represents each said statement of said source program and a store location of said compiled information in said storage means, with a correspondence between each said statement and said store location in accordance the intermediated codes;
    error detecting means for detecting an error during the conversion by said converting means and intercepting the compiling operation of the compiler;
    determining means for selecting, as a result of said error detecting means, the range of statements to be converted by said converting means, in accordance with said information, inclusive of the intermediate codes, stored in said table; and
    means for generating the object program based on the compiled information.

7. A compiler according to claim 6, wherein said compiled information includes an intermediate code.

* * * * *